United States Patent Office 3,068,256
Patented Dec. 11, 1962

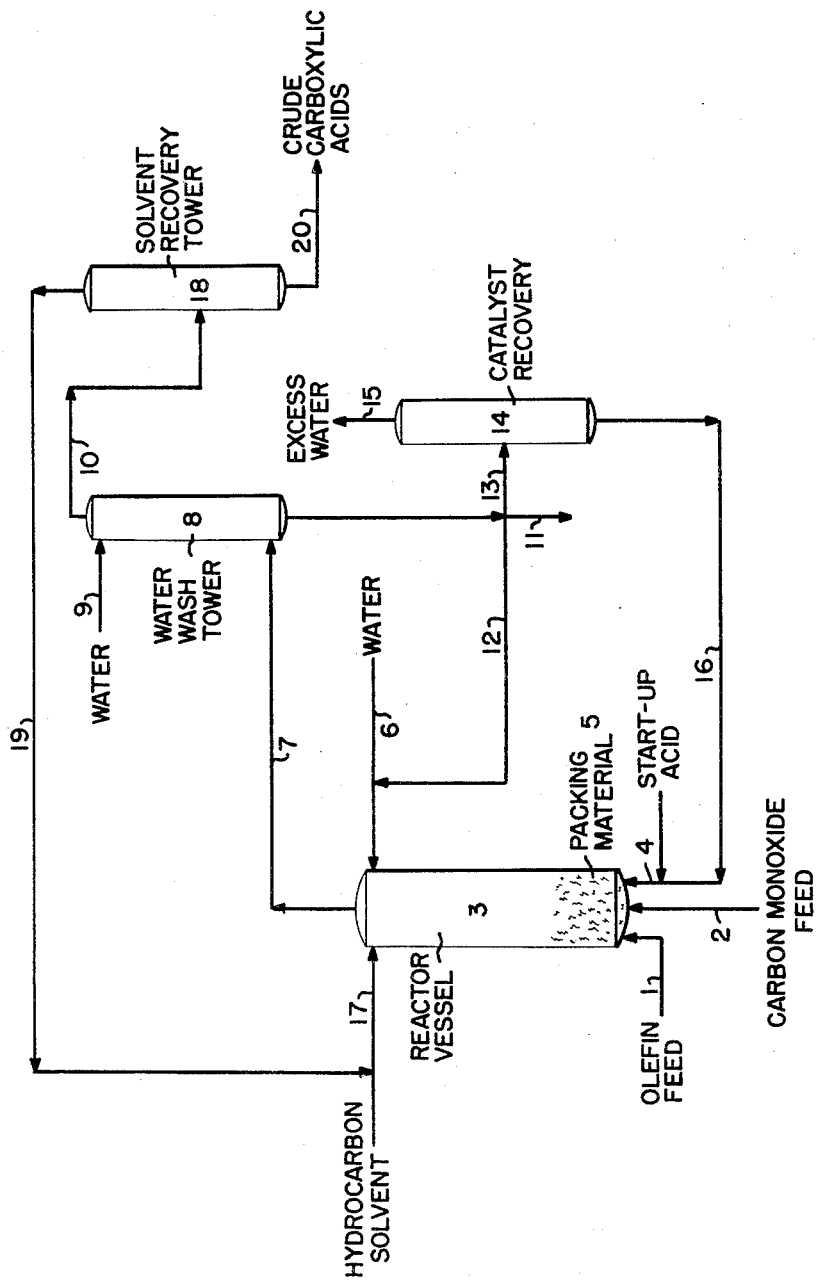

3,068,256
PROCESS FOR PRODUCING CARBOXYLIC ACIDS
Charles Roming, Jr., Towaco, N.J., assignor to Esso Research and Engineering Company, a corporation of Delaware
Filed Aug. 17, 1960, Ser. No. 50,159
10 Claims. (Cl. 260—413)

This invention relates to the production of carboxylic acids. More particularly, the invention relates to an improved one-step process for reacting olefins with carbon monoxide and water in the presence of mineral acid catalysts to produce aliphatic carboxylic acids.

The production of fatty acids from olefins, carbon monoxide and water in the presence of a variety of acidic catalysts is well known. However, the full commercial potential of producing carboxylic acids from these relatively inexpensive reactants has not generally been realized because of certain disadvantages attending processes heretofore proposed. For example, one-step processes for production of carboxylic acids from olefins, carbon monoxide and water, as exemplified by U.S. Patent 1,924,776, while offering many advantages process-wise, require the use of both high temperatures and pressures, for example, 300° to 400° C. and 200 to 1,000 atmospheres. These severe reaction conditions necessitate special equipment capable not only of withstanding the high pressures employed, but capable also of withstanding the severe corrosive effects of the acidic catalysts at the elevated temperatures of reaction. Also, the yield of carboxylic acid product obtained even under the most favorable conditions of reaction in the one-step processes heretofore proposed is not as high as is desired. Attempts, therefore, have been made to overcome these disadvantages, and as illustrated by U.S. Patent 2,831,877, these attempts have been successful up to a point. However, in order to avoid the excessive temperatures and pressures and relatively low yields of the one-step processes of the art, it has been found necessary to carry out the reaction in two steps. In the first step, the olefin and carbon monoxide are reacted in the presence of an acidic catalyst, essentially in the absence of water, to form an intermediate, hydrolyzable, reaction product. This intermediate product is thereafter hydrolyzed in the second step to liberate the desired carboxylic acid product in good yield and the acidic catalyst.

While the disadvantages of the one-step process can be overcome in this way, the advantages inherent in a one-step operation are sacrificed. For example, in the two-step process additional equipment must be provided for the hydrolysis reaction, and such equipment must be resistant to the corrosive action of the acid catalysts. Also, since at least part of the acidic catalyst is recovered from the reaction in diluted form, it must be either discarded or subjected to additional processing to remove excess water before it is suitable for re-use. Either method of disposing of the recovered catalyst necessarily adds to the cost of the desired carboxylic acid product, as does the additional processing equipment for carrying out the hydrolysis step.

A process for producing carboxylic acids from olefins, carbon monoxde and water has now been found which surprisingly combines the advantages of the two-step process with those inherent in the one-step process. This desirable result is accomplished by conducting the reaction in a manner such that the acid catalyst is continuously reconstituted and recycled internally to catalyze the reaction of freshly introduced olefin and carbon monoxide feed. The recycling of the acid catalyst internally is accomplished by utilizing the relatively large difference in density between the acid catalyst and the carboxylic acid reaction products and unreacted feed olefin. Internal recycling of the catalyst in this way affords a considerable advantage over the two-step process because of reduced equipment costs and reduced acid catalyst requirements, as will be shown more fully hereinafter. At the same time, the improved yields and ability to operate at mild reaction conditions, heretofore possible only with a two-step operation, are not sacrificed.

Generally speaking, the present process comprises passing carbon monoxide and a $C_2$ to $C_{24}$ olefin into a reaction zone in the presence of a liquid mineral acid catalyst having a specific gravity in the range of 1.25 to 1.90. The reaction mixture is maintained in the reaction zone for a sufficient time to form an intermediate, hydrolyzable reaction product which is then passed into a hydrolysis zone. Water is countercurrently flowed into the hydrolysis zone, whereby intimate contact between the water and intermediate reaction product occurs and the product is hydrolyzed to yield the desired carboxylic acid product and reconstituted mineral acid catalyst. The carboxylic acid product is removed from the hydrolysis zone for further processing, and the reconstituted mineral acid is internally recycled through the hydrolysis and reaction zones to catalyze the reaction of fresh olefin and carbon monoxide feed.

For a more complete understanding of the invention, reference is made to the accompanying FIGURE which diagrammatically illustrates the present process.

According to the process of the present invention, feed olefin and carbon monoxide are introduced through lines 1 and 2, respectively, into the bottom portion of reactor vessel 3. Alternatively, the olefin and carbon monoxide can be intimately mixed prior to their introduction into the reactor; however, this is not required. Start-up acid catalyst, preferably in sufficient amount to form a pool in the bottom of the reactor through which the olefin and carbon monoxide feeds flow, is also added into the bottom portion of the reactor through line 4. The reactor vessel 3 is packed with any packing material 5 such as is commercially available in various forms, e.g., Raschig rings, Berl saddles, pebbles, etc., it being necessary, of course, that the packing be inert to the reactants and products, offer a large surface area, and produce a tortuous path by which the reactants flow upwardly in the reactor.

As the liquid olefin, gaseous carbon monoxide and liquid acid catalyst pass upwardly through the packed bed of the reactor, they intimately commingle and react to form an intermediate, hydrolyzable reaction product as may be illustrated by the following chemical equation:

(1)

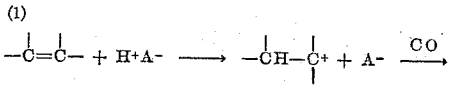

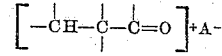

wherein $A^-$ represents the acid anion. This reaction product, as well as any unreacted feed material, is met in the upper portion of the packed bed by a downwardly flowing stream of water which is introduced into the reactor through line 6. Upon contact of the intermediate reaction product with the water, hydrolysis occurs to liberate the desired carboxylic acid product and reconstituted acid:

(2)

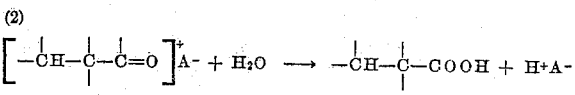

By virtue of the pronounced difference in the density of the reconstituted acid catalyst from that of the carboxylic acid product, the catalyst descends through the packed bed of the reactor vessel until it meets unreacted olefin and carbon monoxide. Reaction thereupon occurs to form new intermediate reaction product, which, in turn, ascends the packed bed until met by water. Hydrolysis again takes place to start the recycling of the acid catalyst downward through the reactor. In this manner, the acid catalyst is continuously re-used for the production of carboxylic acid product without the attendant disadvantages of externally handling large amounts of diluted acids which require concentration before re-use.

The amount of hydrolysis water added to the reactor is not critical; however, for efficient operation, it is preferred to maintain the flow of water so as to supply that amount required to stoichiometrically react with the intermediate reaction product. That is to say, the flow of water is adjusted in relation to the flow of reactants upwardly in the packed reactor so that for each mole of olefin and carbon monoxide reacted, a mole of water is provided for hydrolysis purposes. It is contemplated, that in practice, amounts of water slightly in excess of stoichiometric, for example 1.05 to 1.15 moles of water per mole of olefin and carbon monoxide reacted may advantageously be used so as to insure complete hydrolysis of all the intermediate reaction product without, however, causing dilution of the reconstituted acid catalyst.

Turning now to the carboxylic acid product, this together with any unreacted feed materials and any excess water flows out of the reactor vessel through line 7 and into tower 8 wherein a countercurrent flow of water, introduced through line 9, washes any entrained acid catalyst from the product. The crude carboxylic acid product passes from the wash tower through line 10, while the water washings are discarded through line 11, or if it is economically desirable to retain their acid contents in the process system, the washings can be either recycled through lines 12 and 6 into the reactor with the water stream, or passed through line 13 into a recovery system 14 for concentration. In the latter instance, the excess water removed in the recovery system is discarded through line 15, while the concentrated catalyst is recycled to the reactor through lines 16 and 4.

In a specific embodiment of the process, a hydrocarbon solvent is added into the reactor vessel through line 17 to aid in the separation of the carboxylic acid product from the reconstituted acid catalyst. The carboxylic acid product, dissolved in the hydrocarbon solvent, then passes through line 7, wash tower 8, and line 10 into a solvent recovery tower 18, wherein the carboxylic acid product and solvent are separated. The solvent is then recycled through lines 19 and 17, while the crude carboxylic acid product is passed through line 20 to further processing should, for example, a more pure product be desired.

As noted hereinbefore, the reaction of the olefin and carbon monoxide takes place in the presence of the acid catalyst under relatively mild conditions, neither high temperatures nor high pressures being required or of any particular advantage. Suitable broad, preferred and specific reaction conditions under which the process of the present invention is practiced are set forth in the following table:

TABLE I—REACTION CONDITIONS

|  | Broad | Preferred | Specific |
| --- | --- | --- | --- |
| Temperature, °C | −30 to 100 | 10 to 60 | 50 |
| Pressure, atmos. CO | 10 to 150 | 20 to 60 | 50 |
| Residence time, hrs | 0.5 to 30 | 1 to 10 | 3 |
| Catalyst | $BF_3.2H_2O$ $BF_3/H_2SO_4$ $BF_3/H_3PO_4$ $H_2SO_4$ | $BF_3.2H_2O$ $BF_3/H_2SO_4$ $BF_3/H_3PO_4$ | $BF_3.2H_2O$ |
| Molar ratio catalyst/olefin | 0.5 to 5.0 | 0.70 to 1.25 | 0.75 |
| Monomer acid yield, percent theory | 40 to 95 |  | 80 |

The pressures under which the reaction is conducted are given in the table in terms of carbon monoxide pressures; however, it is not meant to imply that pure carbon monoxide gas is required. Carbon monoxide in the form of synthesis gas, for example, is suitable. Other forms of carbon monoxide may also be utilized as long as the indicated carbon monoxide partial pressures are attained in the reaction vessel. It is, of course, preferable that objectionable acidic components of impure carbon monoxide gases, such as sulfur compounds, carbon dioxide, oxygen or metal carbonyls, be removed from the carbon monoxide feed; however, inert gases such as hydrogen, methane and nitrogen may be present as impurities or diluents, since they do not adversely affect the desired reaction. Regardless of whether pure gas or a diluted mixture is used, the amount of carbon monoxide supplied to the reactor is, of course, in excess of that required to stoichiometrically react with the olefin feed. To provide an adequate excess, at least 1000 s.c.f. carbon monoxide/bbl. olefin feed should be provided and preferably, between 1500 and 2500 s.c.f./bbl. of feed.

The olefin feed to the reactor can be any olefin which normally is in the liquid state under the conditions of reaction. That is to say, olefins having from 2 to 24 carbon atoms and mixtures thereof are suitable. For example, aliphatic olefins such as ethylene, propylene, butylene, isobutylene, pentylenes, decenes, hexadecenes, octadecenes, etc., and mixtures of these olefins may be used. However, olefins having 4 to 15 carbon atoms are preferred. The $C_6$ to $C_{15}$ branched olefins produced by the polymerization of propylene, are an especially desirable feedstock for they give rise to sterically-hindered acids, which in turn yield very stable esters. Such esters are valuable in the production of synthetic lubricants. This should not be construed to infer that olefins of different molecular weight and/or normal structure are not suitable as feeds for the present process. However, the higher molecular weight olefins are not readily available, and it is generally recognized that in the presence of acids, olefins of lower molecular weight, and especially those having essentially straight chains, are particularly susceptible to polymerizaton. While the unsaturated dimer, trimer, and higher polymers thus formed are also substantially converted into carboxylic acid products in the present process, nevertheless, the yield of the desired monomeric product per unit of olefin feed is thereby necessarily reduced. Furthermore, the high molecular weight carboxylic acids are not adaptable to as wide a variety of uses as the lower molecular weight acids, and in addition, are less susceptible to recovery and purification. For these reasons, it may be desired to avoid their formation.

The acidic catalysts utilized in the present process are liquid mineral acids having specific gravities greater than about 1.25. It is essential that the specific gravity of the acid not be lower than this value in order that the proper degree of recycling be attained in the reactor. Preferred acids are those having specific gravities of at least 1.35 and especially preferred are acids of 1.5 to 1.85 specific gravity. With the latter acids, not only is improved recycling realized, but the yields of product produced in the presence of such catalysts are greater. Suitable mineral acids having specific gravities in the proper range include sulfuric acid, boron trifluoride dihydrate, and mixtures of boron trifluoride with sulfuric or phosphoric acids. The boron trifluoride comprising catalysts are especially preferred, with boron trifluoride dihydrate being most preferred because of its superior activity in producing high yields of the desired carboxylic acid products, particularly those derived from branched chain, higher molecular weight olefins. Boron trifluoride dihydrate is a true compound, $BF_3.2H_2O$, with a density of about 1.6. It may be prepared by passing $BF_3$ gas into vigorously agitated water at a temperature of about 20° C. or less until the weight increase corresponds to the addition of 0.5 mole.

of $BF_3$ per mole of water. The other boron fluoride comprising catalysts may be produced by passing $BF_3$ into 85% phosphoric acid or into sulfuric acid at 100° C. until about 0.75 to about 1.5 moles of $BF_3$ per mole of phosphoric or sulfuric acid is absorbed. Sulfuric acid, when utilized as the sole acidic ingredient of the catalyst, is generally employed in concentrations of 90 to 100%, the lower concentrations being preferred when the olefin feed contains major amounts of straight chain olefins so as to reduce polymerization to a minimum. Typical acid compositions suitable in the present process are set forth in the following table:

| Acid catalyst | Preferred mole ratio | Specific gravity (20/4° C.) | |
|---|---|---|---|
| | | Broad range | Preferred range |
| $BF_3/H_2O$ | 1/2 | 1.30-1.70 | 1.55-1.65 |
| $BF_3/H_3PO_4/H_2O$ | 0.75-1.5/1/1 | 1.25-1.90 | 1.65-1.85 |
| $H_2SO_4/H_2O$ | 1.0-4.5/1 (96% acid) | 1.60-1.83 | 1.80-1.835 |
| $BF_3/H_2SO_4/H_2O$ | 85% $H_2SO_4$ saturated with $BF_3$. | 1.25-1.85 | 1.75-1.81 |

The advantages offered by the process will be more fully appreciated from the following examples which are included for illustration and not for limitation of the invention.

*Example 1*

To demonstrate the advantage of the one-step process of the present invention in which the acid catalyst is internally recycled over the two-step process of the prior art, wherein the catalyst is externally separated from the carboxylic acid product, the following series of experiments were conducted.

Tripropylene, derived from the phosphoric acid catalyzed polymerization of propylene, was reacted in a stainless steel autoclave at a pressure of 1000 p.s.i.g. CO pressure and at ambient temperature (about 23° C.). The catalyst used was produced by saturating 85% phosphoric acid with boron trifluoride (1.5/1/1 mole ratio of $BF_3/H_3PO_4/H_2O$, specific gravity about 1.75). During the reaction, which varied from 2 to 6 hours, the temperature rose to about 40° C. and the pressure to 1200-1500 p.s.i.g.

At the completion of the reaction, the autoclave was vented to the atmosphere, and the products transferred to a separatory funnel. A stoichiometric amount of water, based on olefin, was added. The mixture was then extracted with an equal volume of petroleum ether in order to separate as completely as practicable the carboxylic product layer from the acid catalyst layer. Even by this stringent separation procedure, however, only 94 to 97% of the original amount of acid catalyst utilized could be recovered.

In contrast to the catalyst losses of at least 3%, obtained even under the careful separation of this example of the two-step process, catalyst losses are reduced by employing the internal recycling of the present invention to the order of 1% and certainly less than 2%. The economic importance of reducing catalyst losses to a minimum is illustrated by the following estimate of $BF_3$ costs per pound of carboxylic acid product in a 20 million lb./yr. $C_{10}$ carboxylic acid plant using tripropylene as the feed:

| | Number of catalyst cycles before complete depletion | |
|---|---|---|
| | 25 | 40-50 |
| Cost of $BF_3$, cents/lb. of carboxylic acid (based on 65 cents/lb. $BF_3$) | 1.4 | 0.8 |

The savings in boron trifluoride realized from recycling 40-50 times over only 25 times before complete depletion of the catalyst amounts to $120,000 annually in a plant of the described size.

*Example 2*

The feasibility of using recycled acid catalyst was illustrated by employing the acid catalyst layer, separated as in Example 1, as the sole catalyst in subsequent experiments. The results of four cycles were as follows:

| Cycle | Olefin conversion, weight percent | Selectivity, weight percent | |
|---|---|---|---|
| | | $C_{10}$ acid | $C_{19+}$ acid |
| 1 | 95 | 63 | 35 |
| 2 | 85 | 73 | 25 |
| 3 | 98 | 83 | 15 |
| 4 | 98 | 85 | 13 |

It can be seen from these data that the recycled acid does not diminish in activity with re-use, and that high olefin conversions and selectivities to $C_{10}$ acids are obtained.

The substantial economic advantage of the one-step process of the present invention, insofar as equipment costs are concerned, is illustrated by the following cost comparison for a plant capable of producing 20 million lb./yr. of $C_{10}$ carboxylic acid from tripropylene. The estimates were based on a plant service factor of 90% and all type 316 stainless steel equipment. Carbon monoxide facilities, which would be identical in each process, are not included.

| Equipment | One-step process of the present invention | Two-step process utilizing separate reaction and hydrolysis sections |
|---|---|---|
| Reaction section | $500,000 | $400,000 |
| Hydrolysis and catalyst recovery section | 250,000 | 650,000 |
| Product distillation section including solvent recovery | 725,000 | 725,000 |
| Total | 1,475,000 | 1,775,000 |

While the invention has been described with reference to various examples and embodiments, it will be apparent to those skilled in the art that various modifications may be made without departing from the principles and true nature of the invention which is intended to be limited only by the scope of the claims.

What is claimed is:

1. A process for producing aliphatic carboxylic acids which comprises passing a mixture comprising an olefin having 2 to 24 carbon atoms and carbon monoxide into the bottom part of a reaction zone that contains a liquid mineral acid catalyst having a specific gravity greater than 1.25, passing said mixture upwardly through the reaction zone thereby forming an intermediate reaction product of said olefin, carbon monoxide and mineral acid, passing said intermediate reaction product upwardly through a hydrolysis zone, countercurrently passing water through said hydrolysis zone so that the intermediate reaction product is hydrolyzed and forms an aliphatic carboxylic acid and mineral acid catalyst, removing said carboxylic acid from the upper part of the hydrolysis zone and internally recycling the reconstituted catalyst downwardly through said hydrolysis zone and said reaction zone in countercurrent relationship to fresh olefin and carbon monoxide by means of its difference in density.

2. A process according to claim 1 in which a temperature in the range of −30° C. to 100° C. and a carbon monoxide partial pressure of about 10 to 100 atmospheres is maintained in said reaction zone.

3. A process according to claim 1 in which the amount of water passed into the hydrolysis zone is at least sufficient to stoichiometrically react with the intermediate reaction product.

4. A process according to claim 1 in which the olefin is isobutylene.

5. A process according to claim 1 in which the olefin is $C_6$ to $C_{15}$ branched chain polymer of propylene.

6. A process according to claim 1 in which the mineral acid catalyst comprises boron trifluoride.

7. A process according to claim 1 in which the mineral acid catalyst is boron trifluoride dihydrate.

8. In the process of producing carboxylic acids by reacting $C_2$ to $C_{24}$ olefins in a packed reaction zone with carbon monoxide in the presence of a boron trifluoride comprising catalyst having a specific gravity in the range of 1.25 to 1.90 at temperatures in the range of 10° C. to 60° C. and at carbon monoxide partial pressures of 20 to 60 atmospheres for a period of 1 to 10 hours to form an intermediate hydrolyzable reaction product which is hydrolyzed with 1.05 to 1.15 moles of water per mole of olefin and carbon monoxide reacted to produce a carboxylic acid product and reconstituted catalyst, the improvement which comprises internally recycling the reconstituted catalyst downwardly through said packed reaction zone and countercurrent to the flow of freshly introduced reactants by means of its difference in density.

9. A process according to claim 8 in which the mineral acid catalyst is boron trifluoride dihydrate.

10. A process according to claim 8 in which the olefin is a $C_6$ to $C_{15}$ branched chain polymer of propylene.

References Cited in the file of this patent
UNITED STATES PATENTS

| | | |
|---|---|---|
| 2,768,968 | Reppe et al. | Oct. 30, 1956 |
| 2,876,241 | Koch et al. | Mar. 3, 1959 |